(12) United States Patent
Locklear et al.

(10) Patent No.: US 11,230,614 B2
(45) Date of Patent: Jan. 25, 2022

(54) METHODS FOR MAKING POLYETHYLENE POLYMERS

(71) Applicant: ExxonMobil Chemical Patents Inc., Baytown, TX (US)

(72) Inventors: Brandon C. Locklear, Tokyo (JP); Haiqing Peng, Sugar Land, TX (US); Bruce J. Savatsky, Kingwood, TX (US); James M. Farley, League City, TX (US); Daniel P. Zilker, Easton, PA (US); Robert O. Hagerty, Wyckoff, NJ (US); Michael E. Muhle, Kingwood, TX (US); Fathi D. Hussein, Hilton Head Island, SC (US)

(73) Assignee: ExxonMobil Chemical Patent Inc., Baytown, TX (US)

( * ) Notice: Subject to any disclaimer, the term of this patent is extended or adjusted under 35 U.S.C. 154(b) by 110 days.

(21) Appl. No.: 16/482,940

(22) PCT Filed: Dec. 13, 2017

(86) PCT No.: PCT/US2017/065979
§ 371 (c)(1),
(2) Date: Aug. 1, 2019

(87) PCT Pub. No.: WO2018/144139
PCT Pub. Date: Aug. 9, 2018

(65) Prior Publication Data
US 2020/0010585 A1 Jan. 9, 2020

Related U.S. Application Data

(60) Provisional application No. 62/454,128, filed on Feb. 3, 2017.

(51) Int. Cl.
| | | |
|---|---|---|
| *C08F 10/02* | (2006.01) | |
| *B29B 9/12* | (2006.01) | |
| *B29B 9/16* | (2006.01) | |
| *B29C 39/00* | (2006.01) | |
| *C08J 5/18* | (2006.01) | |
| *C08F 2/34* | (2006.01) | |
| *C08F 2/38* | (2006.01) | |

(52) U.S. Cl.
CPC ............... *C08F 10/02* (2013.01); *B29B 9/12* (2013.01); *B29B 9/16* (2013.01); *B29C 39/003* (2013.01); *C08J 5/18* (2013.01); *B29K 2023/06* (2013.01); *C08J 2323/06* (2013.01); *C08J 2323/08* (2013.01)

(58) Field of Classification Search
None
See application file for complete search history.

(56) References Cited

U.S. PATENT DOCUMENTS 4,558,105 A 12/1985 Carrick et al.
5,730,885 A 3/1998 Blakeslee et al.
(Continued)

*Primary Examiner* — Fred M Teskin
(74) *Attorney, Agent, or Firm* — ExxonMobil Chemical Patents Inc.—Law Department

(57) ABSTRACT

Methods for reducing gels and/or dome sheeting in gas phase polymerization processes and their resulting products are provided. The polymerization processes include polymerizing ethylene and one or more optional comonomers in a fluidized bed reactor in the presence of a metallocene catalyst, hydrogen, and at least one condensing agent.

14 Claims, 9 Drawing Sheets

(56) References Cited

U.S. PATENT DOCUMENTS

| | | | |
|---|---|---|---|
| 6,485,662 | B1 | 11/2002 | Neubauer et al. |
| 6,562,915 | B2 | 5/2003 | Mahling et al. |
| 7,090,927 | B2 * | 8/2006 | Shannon ............. C08L 23/0815 |
| | | | 428/523 |
| 7,393,916 | B2 | 7/2008 | Neubauer et al. |
| 7,582,709 | B2 | 9/2009 | Goossens et al. |
| 9,289,935 | B2 | 3/2016 | Meier et al. |
| 2009/0234081 | A1 | 9/2009 | Thomas, Jr. et al. |
| 2012/0053304 | A1 | 3/2012 | Fouarge et al. |
| 2015/0259445 | A1 * | 9/2015 | Kapur .................. C08F 210/16 |
| | | | 526/348.5 |
| 2017/0120499 | A1 | 5/2017 | Li |
| 2017/0355790 | A1 | 12/2017 | Savatsky et al. |

\* cited by examiner

METHODS FOR MAKING POLYETHYLENE POLYMERS

CROSS-REFERENCE OF RELATED APPLICATIONS

This application is a National Phase Application claiming priority to PCT Application Serial No. PCT/US2017/065979 filed Dec. 13, 2017, which claims the benefit U.S. Provisional Application No. 62/454,128 filed Feb. 3, 2017, the disclosures of which are hereby incorporated by reference in their entirety.

FIELD OF THE INVENTION

Embodiments provided herein generally relate to methods for making polyolefin polymers such as polyethylene polymers. More particularly, embodiments provided herein relate to methods for making polyethylene polymers that may be converted into films having low or reduced gels. Additionally, other embodiments relate to methods for reducing dome sheeting in gas phase polymerization processes.

BACKGROUND OF THE INVENTION

The presence of "gels" is a problem in the production of polyolefin polymers, especially for gas phase metallocene catalyzed polyethylene (PE) polymers that will be used for the manufacture of films. Metallocene catalyzed polyethylenes (mPE) may typically contain polymeric gels that increase in frequency when the melt index (MI) ($I_2$) decreases below a 0.5 g/10 min. Gels are highly localized imperfections in the polyolefin material that become apparent when the material is converted into films. Gels are visually distinct from the surrounding film, mostly due to the presence of high concentrations of unblended polymer, unreacted catalyst and activator, or both. Gels may also be attributed to concentrations of high molecular weight PE, oxidized PE, fibers from additive packages, etc. The presence of gels lowers the value of film, and in some cases makes the films unmarketable.

Film quality can be tested by a subjective visual test, such as a film appearance rating (FAR) or with an advanced camera technology, such as a system from Optical Control Systems (OCS). OCS is a measurement of optical imperfections of a film. FAR tests are completed by visually comparing film to a set of standards and assigning a value that is closest to one of the standards. For the OCS method, the camera detects gels and defects within preset size tolerances, and calculates a total defect area (TDA) in ppm. The equipment and methodology for conducting tests and describing OCS results may be found in the Example Section of U.S. Pat. No. 7,393,916.

Gels are impacted by $H_2$ gas and/or condensing agents, such as isopentane, as both of these influences the melt index of the polymer. Polymeric gels also increase in frequency when a small fraction of a dissimilar resin is mixed into the reactor bed. Such dissimilar resins can be the result of process upsets within the reactor that results in resins having different molecular weights or densities. Robust process control is typically practiced to prevent such reaction upsets that lead to mixing dissimilar resins into the bed.

Several post reaction techniques have also be used to reduce the number of gels. Filtering the polymer melt using a screen mesh is a common technique to remove gels prior to forming films. Such processes have been described in, for example, FILTRATION OF POLYMER MELTS (D. Gneuss, ed., VDI-Verlag GmbH, Dusseldorf 1981).

U.S. Pat. No. 5,730,885 discloses a process that uses multiple screens, those coarser than 250 mesh, thus avoiding undesirable back pressure and ripping of the screens.

U.S. Pat. No. 6,485,662 discloses a process that passes a melt through a single active mesh screen that has a relatively large mesh, those finer than 200 mesh having a micron retention size range of from 2 to 70 microns, in combination with several small mesh passive screens.

U.S. Pat. No. 7,393,916 discloses a process for making bimodal polyolefins with reduced gels by forming a melt of the polyolefin and passing the polyolefin through one or more active screen filter(s) having a mesh size of from 70 to 200 micron at a mass flux of from 5 to 100 lbs/hr/square inch, and isolating the polyolefin after having passed through the screen filter.

However, there remains a need for methods that reduce gels in films made from polyolefin polymers such as metallocene polyethylene polymers.

SUMMARY OF THE INVENTION

The invention provides for a method for reducing gels in a polyethylene polymer, the method comprising: polymerizing ethylene and one or more optional comonomers in a fluidized bed reactor in the presence of a metallocene catalyst, hydrogen, and at least one condensing agent; and controlling the content of the hydrogen and the at least one condensing agent in the fluidized bed reactor at conditions sufficient to form the polyethylene polymer having a melt index ($I_2$) of from 0.1 g/10 min to 3.0 g/10 min and a density of from 0.890 g/cm$^3$ to 0.950 g/cm$^3$, wherein the conditions sufficient to form the polyethylene polymer comprise a reaction temperature of from 60° C. to 120° C. and a residence time of from 0.5 to 5 hr.

In another class of embodiments, the invention provides for a method for reducing gels in a polyethylene polymer, the method comprising: polymerizing ethylene and one or more optional comonomers in a reactor in the presence of a metallocene catalyst, hydrogen, and at least one condensing agent to produce polyethylene polymer granules; removing polyethylene polymer granules that are 400 microns or less; melting the remaining polyethylene polymer granules after having removed the polyethylene polymer granules that are 400 microns or less; and then producing a film having an OCS gel count of 175 ppm or less.

In yet another class of embodiments, the invention provides for a method for reducing dome sheeting in a gas phase, fluidized bed reactor, the method comprising: polymerizing ethylene and one or more optional comonomers, at least one condensing agent, and hydrogen, in a fluidized bed reactor in the presence of a supported metallocene catalyst; and controlling the content of the hydrogen and the at least one condensing agent in the fluidized bed reactor at conditions sufficient to form polyethylene polymer granules having a melt index ($I_2$) of from 0.1 g/10 min to 3.0 g/10 min and a density of from 0.890 g/cm$^3$ to 0.950 g/cm$^3$, wherein the conditions sufficient to form the polyethylene polymer granules comprise a reaction temperature of from 60° C. to 120° C., a residence time of from 0.5 to 5 hr, and wherein the supported metallocene catalyst has a measured charge of from 0.19 to 0.31 micro-coulombs/gram (negative).

DETAILED DESCRIPTION

Figure 1:
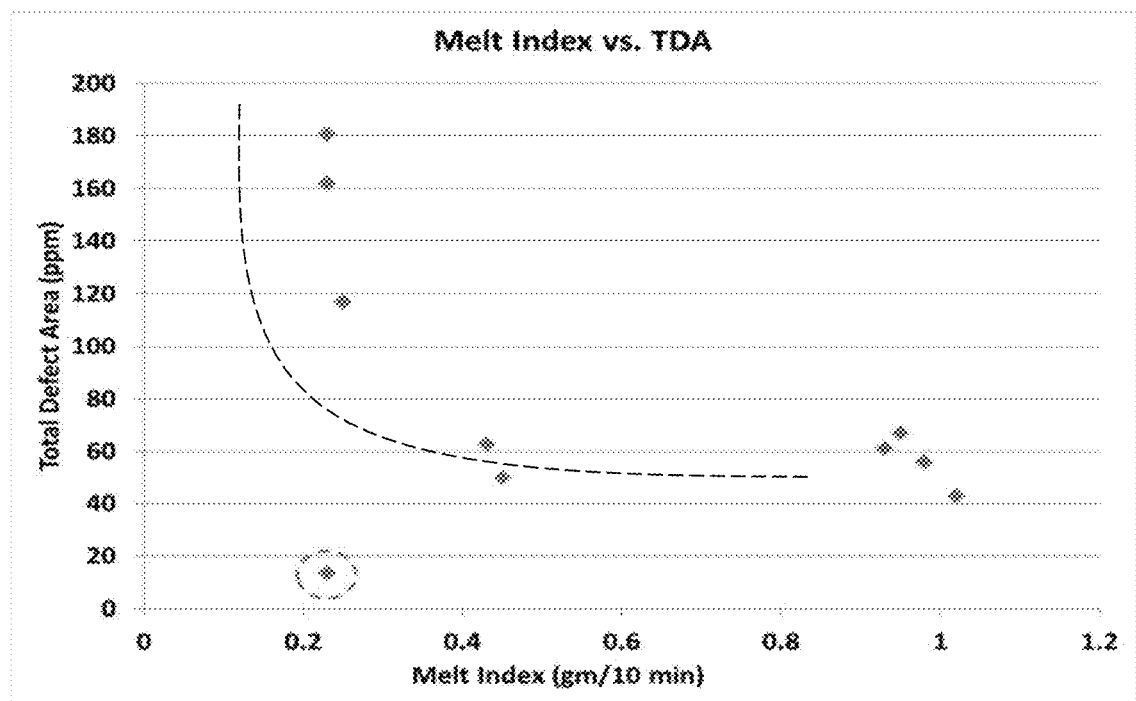
FIG. 1 is a plot showing the relationship between MI and TDA of the polymer obtained in Example 1, according to one or more embodiments described.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

The invention provides for a method for reducing gels in a polyethylene polymer, the method comprising: polymerizing ethylene and one or more optional comonomers in a fluidized bed reactor in the presence of a metallocene catalyst, hydrogen, and at least one condensing agent; and controlling the content of the hydrogen and the at least one condensing agent in the fluidized bed reactor at conditions sufficient to form the polyethylene polymer.

In another class of embodiments, the invention provides for a method for reducing gels in a polyethylene polymer, the method comprising: polymerizing ethylene and one or more optional comonomers in a reactor in the presence of a metallocene catalyst, hydrogen, and at least one condensing agent to produce polyethylene polymer granules; removing polyethylene polymer granules that are 400 microns or less; melting the remaining polyethylene polymer granules after having removed the polyethylene polymer granules that are 400 microns or less; and then producing a film having an OCS gel count of 175 ppm or less.

In yet another class of embodiments, the invention provides for a method for reducing dome sheeting in a gas phase, fluidized bed reactor, the method comprising: polymerizing ethylene and one or more optional comonomers, at least one condensing agent, and hydrogen, in a fluidized bed reactor in the presence of a supported metallocene catalyst; and controlling the content of the hydrogen and the at least one condensing agent in the fluidized bed reactor at conditions sufficient to form polyethylene polymer granules: wherein the supported metallocene catalyst has a measured charge of from 0.19 to 0.31 micro-coulombs/gram (negative).

In any of the embodiments described herein, the reaction temperature may be in the range from 50° C. to 150° C., 60° C. to 120° C., or 70° C. to 90° C.

In any of the embodiments described herein, the residence time may be from 0.5 to 5 hr, 1 to 4 hr, 1 to 3 hr, 1 to 2 hr, or 2 to 4 hr. As used herein, "residence time" refers to the weight in the polymer bed in the reactor (in lb or kg) divided by the polymer production rate (lb/hr or kg/hr). The residence time is specified in hours (hr).

In any of the embodiments described herein, the production rate may be from 20 to 400,000 lbs polymer per hour (lbs/hr), from 10,000 to 350,000 lbs polymer per hour, from 20,000 to 175,000 lbs polymer per hour, from 25,000 to 200,000 lbs polymer per hour, or from 50,000 to 200,000 lbs polymer per hour.

In any of the embodiments described herein, the method may include hydrogen and the hydrogen may be maintained at a hydrogen to monomer (e.g., ethylene) mole ratio from about 0.5 to about 10.0 ppm/mol %, from about 1.0 to about 8.0 ppm/mol %, from about 3.0 to about 7.8 ppm/mol %, from about 3.2 to about 8.0 ppm/mol %, or from about 3.2 to about 6.8 ppm/mol % (ppm of hydrogen per mol % of monomer (e.g., ethylene)).

Methods for reducing gels in low melt index polyethylene polymers are provided. The polyethylene polymer may include from 70.0 mol % to 100.0 mol % of units derived from ethylene. The polyethylene polymer may have a low ethylene content limit of 70.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene polymer may have an upper ethylene content limit of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene. For polyethylene copolymers, the polyethylene polymer may have less than 50.0 mol % of polymer units derived from a C3-C20 olefin, preferably, an alpha-olefin, e.g., butene, hexene or octene. The lower limit on the range of C3-C20 olefin-content may be 25.0 mol %, 20.0 mol %, 15.0 mol %, 10.0 mol %, 8.0 mol %, 6.0 mol %, 5.0 mol %, 4.0 mol %, 3.0 mol %, 2.0 mol %, 1.0 mol %, or 0.5 mol %, based on polymer units derived from the C3-C20 olefin. The upper limit on the range of C3-C20 olefin-content may be 20.0 mol %, 15.0 mol %, 10.0 mol %, 8.0 mol %, 6.0 mol %, 5.0 mol %, 4.0 mol %, 3.0 mol %, 2.0 mol %, or 1.0 mol %, based on polymer units derived from the C3 to C20 olefin. Any of the lower limits may be combined with any of the upper limits to form a range. Comonomer content is based on the total content of all monomers in the polymer.

In some embodiments, the polyethylene polymer may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of g'vis≥0.980, 0.985, ≥0.99, ≥0.995, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In some embodiments, the polyethylene polymers may have a density in accordance with ASTM D-4703 and ASTM D-1505/ISO 1183 of from about 0.890 to about 0.953 g/cm$^3$, about 0.910 g/cm$^3$ to about 0.950 g/cm$^3$, from about 0.910 to about 0.949 g/cm$^3$, from about 0.910 to about 0.925 g/cm$^3$, from about 0.915 to about 0.921 g/cm$^3$, from about 0.910 to about 0.923 g/cm$^3$, from about 0.912 to about 0.918 g/cm$^3$, or from about 0.912 to 0.917 g/cm$^3$.

The weight average molecular weight (Mw) of the polyethylene polymers may be from about 15,000 to about 500,000 g/mol, from about 20,000 to about 250,000 g/mol, from about 25,000 to about 150,000 g/mol, from about 150,000 to about 400,000 g/mol, from about 200,000 to about 400,000 g/mol, or from about 250,000 to about 350,000 g/mol.

The polyethylene polymers may have a molecular weight distribution (MWD) or (Mw/Mn) of from about 1.5 to about 5.0, from about 2.0 to about 4.0, from about 3.0 to about 4.0, or from about 2.5 to about 4.0.

The polyethylene polymers may have a z-average molecular weight (Mz) to weight average molecular weight (Mw) greater than about 1.5, or greater than about 1.7, or greater than about 2.0. In some embodiments, this ratio is from about 1.7 to about 3.5, from about 2.0 to about 3.0, or from about 2.2 to about 3.0.

The polyethylene polymers may have a melt index (MI) or (I$_2$) as measured by ASTM D-1238-E (190° C./2.16 kg) of about 0.1 to about 300 g/10 min, about 0.1 to about 100 g/10 min, about 0.1 to about 50 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, about 0.4 g/10 min to about 0.9 g/10 min, about 0.4 g/10 min to about 0.85, g/10 min, about 0.5 g/10 min to about 1.0 g/10 min, about 0.6 g/10 min to about 1.0 g/10 min, about 0.7 g/10 min to about 1.0 g/10 min, or about 0.75 g/10 min to about 0.95 g/10 min.

The polyethylene polymers may have a melt index ratio (MIR) (I$_{21.6}$/I$_{2.16}$) or (I$_{21}$/I$_2$, as a short hand) of from about 10.0 to about 50.0, from about 15.0 to about 45.0, from about 20.0 to about 40.0, from about 20.0 to about 35.0, from about 22 to about 38, from about 20 to about 32, from about 25 to about 31, or from about 28 to about 30.

In some embodiments, the polyethylene polymers may have at least a first peak and a second peak in a comonomer distribution analysis, wherein the first peak has a maximum at a log(Mw) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log(Mw) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In any of the embodiments above or elsewhere herein, the polyethylene polymer may have one or more of the following properties: a melt index (MI) (190° C./2.16 kg) of from about 0.1 g/10 min to about 5.0 g/10 min; a melt index ratio (MIR) of from about 15 to about 30; a Mw of from about 20,000 to about 200,000 g/mol; a Mw/Mn of from about 2.0 to about 4.5; and a density of from about 0.910 to about 0.925 g/cm$^3$.

In any of the embodiments above or elsewhere herein, the polyethylene polymer may have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In some embodiments, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

In some embodiments, the polyethylene polymer may have a comonomer content of about 10, about 11 or about 12 terminal methyl groups per 1000 carbon atoms, as measured by H$^1$ NMR. The comonomer content may also range from a low of about 10, 11, or 12 to a high of about 25, 20, or 18 terminal methyl groups per 1000 carbon atoms, as measured by H$^1$ NMR. Preferably, the comonomer content is about 12 terminal methyl groups per 1000 carbon atoms or more.

Additionally, the melt strength of the polyethylene polymer at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec2. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The melt strength of the polyethylene polymer may be in the range from about 1 to about 100 cN, about 1 to about 50 cN, about 1 to about 25 cN, about 3 to about 15 cN, about 4 to about 12 cN, or about 5 to about 10 cN.

Materials and processes for making the polyethylene polymer have been described in, for example, U.S. Pat. No. 6,956,088, particularly Example 1; U.S. Publication No. 2009/0297810, particularly Example 1; U.S. Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

As used herein, the term "metallocene catalyst" refers to at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium. Metallocenes may also be named in accordance with their transition metals. For example, a metallocene comprising zirconium as a transition metal may be called a zirconocene, a metallocene comprising hafnium as a transition metal may be called a hafnocene, etc.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™, Drakol™, or Hydrobrite™ mineral oils) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See U.S. Pat. Nos. 4,543,399, 4,588,790, 5,028,670, 5,317,036, 5,352,749, 5,405,922, 5,436,304, 5,453,471, 5,462,999, 5,616,661, and 5,668,228.) To obtain the polyethylene polymers also, individual flow rates of ethylene, comonomer, and hydrogen should be controlled and adjusted to obtain the desired polymer properties. Condensing agents or inert/induced condensing agents (ICA's) generally include hydrocarbons having little to no solvent power regarding the polymer product(s). Suitable condensing agents include $C_3$-$C_8$ hydrocarbons and mixtures thereof, preferably $C_3$-$C_6$ hydrocarbons and mixtures thereof, including linear, branched, cyclic, substituted hydrocarbons, as well as their respective isomers. The at least one condensing agent may comprise isopentane.

In a class of embodiments of the invention, at least one condensing agent may be used with other condensing agents, for example, other $C_4$-$C_8$ condensing agents or mixtures thereof as described above. In particular, the condensing agent may comprise a mixture of isopentane and at least another $C_4$-$C_8$ condensing agent of the chemical formula $C_nH_{2n+2}$, where n is 4 to 8, e.g., n-butane, isobutane, n-pentane, propane, 2,2-dimethylpropane, n-hexane, isohexane, n-heptane, n-octane, or mixtures of two or more thereof.

The condensing agent may be used in a gas phase polymerization process or simply a gas phase process. The gas phase process is operated in a condensed mode where a condensing agent as described above is introduced to the process at a temperature below the dew point of the gas to increase the cooling capacity of the recycle stream. The gas phase process is particularly well-suited for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid, is greater than 5 weight percent, preferably, greater than 10 weight percent, or greater than 15 weight percent or greater than 20 weight percent, more preferably greater than 25 weight percent, based on the total weight of the liquid and gas entering the reactor. For further details of a condensed mode process see, for example, U.S. Pat. No. 5,436,304.

Suitable polyethylene polymers include those commercially available from ExxonMobil Chemical Company, Houston, Tex., and sold under Exceed mPE and Exceed XP™ metallocene polyethylene (mPE). Exceed XP™ mPE offers step-out performance with respect to, for example, dart drop impact strength, flex-crack resistance, and machine direction (MD) tear, as well as maintaining stiffness at lower densities. Exceed XP™ mPE also offers optimized solutions for a good balance of melt strength, toughness, stiffness, and sealing capabilities which makes this family of polymers well-suited for blown film/sheet solutions.

Other suitable polyethylene polymers include those commercially available from ExxonMobil Chemical Company as Enable™ metallocene polyethylene (mPE) resins.

The polyethylene polymers may be suitable for such articles as films, fibers and nonwoven fabrics, extruded articles and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or nonwoven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc. Examples of injection molding applications include crates, containers, bins, pails, housewares, food containers, base cups, and drink cups.

Films may be prepared by any conventional techniques known to those skilled in the art, including for example, techniques utilized to prepare blown, extruded/coextruded, and/or cast films. The films may have at least two, at least three, or at least four layers. In one embodiment, the film can be multilayer sheets having three to ten layers. With reference to multilayer sheets, the sheets may have the same layer or different layers. The following notation may be used for illustration. Each layer of a sheet is denoted "A" or "B". Where a sheet includes more than one A layer or more than one B layer, one or more prime symbols (',",''', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer sheet having an inner layer of the polyethylene resin or blend between two outer layers would be denoted A/B/A'. Similarly, a five-layer sheet of alternating layers would be denoted A/B/A'/B'/A". Unless otherwise indicated, the left-to-right or right-to-left order of layers does not matter, nor does the order of prime symbols; e.g., an A/B sheet is equivalent to a B/A sheet, and an A/A'/B/A" sheet is equivalent to an A/B/A'/A" sheet.

The sheets may be tailored to specific applications by adjusting the thickness, materials and order of the various layers, as well as the additives and other components in each layer. The total thickness of a monolayer or multilayer sheets may vary based upon the application desired. A total sheet thickness of from about 5.0 mil to more than 30.0 mil is suitable for many applications. Alternative embodiments include from about 5.0 mil to about 100.0 mil, from about 5.0 mil to about 80.0 mil, from about 10.0 mil to about 60.0 mil, or from about 10.0 mil to about 40.0 mil.

In another class of embodiments, the sheet may have a sheet thickness of ≥5 mil, a sheet thickness of ≥7 mil, a sheet thickness ≥10 mil, a sheet thickness of ≥15 mil, a sheet thickness of ≥20 mil, a sheet thickness ≥30 mil, a sheet thickness of ≥40 mil, or a sheet thickness of ≥50 mil. Those skilled in the art will appreciate that the thickness of individual layers may be adjusted based on the desired end use application and performance, resin(s) employed, equipment capability, desired output and operability constraints, and other factors.

In other embodiments, it has been discovered that gels can be reduced by controlling polyethylene granules size distribution. In particular, it has been found that removing small particles from the polyethylene granules before pelletization helps to reduce gels. Although any known technique can be used, sieving the polymer granules using one or more mesh screens are preferred. For example, the polymer granules can be sieved with one, two, or three or more different mesh screens, to obtain granules of different sizes. Suitable mesh sizes includes 20, 30 and 45 microns, for example. The screens can be arranged by beginning with the larger micron retention size, proceeding to a smaller micron retention size, and ending with a larger micron retention size. The term "screen" includes screens, sieves, and other filter media for which the micron retention size can be determined. A description of various filter media can be found in, for example, FILTRATION OF POLYMER MELTS (1988).

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

The foregoing discussion can be further described with reference to the following non-limiting Examples 1 through 8. In Examples 1-6, the catalyst was XCAT™ VP-100 Metallocene Catalyst contacted with MAO (methyl aluminoxane) and supported on silica, available from Univation Technologies, LLC, Houston, Tex. Methods for preparing the catalyst are described in more detail in U.S. Pat. Nos. 6,956,088, 8,824,065, and WO 2014/081505.

Example 1

In this example, the effect of isopentane, melt index, and residence time on gel formation was observed. A continuous pilot-scale gas phase fluidized bed reactor of 14 inches internal diameter was used for this example. The fluidized bed was made up of polymer granules. The gaseous feed streams of ethylene and hydrogen together with liquid hexene were introduced below the reactor bed into the recycle gas line. The individual flow rates of ethylene, hydrogen, and hexene were controlled to maintain fixed composition targets. The ethylene concentration was controlled to maintain a constant ethylene partial pressure of about 220 psia. The hydrogen was controlled to maintain a hydrogen to ethylene mole ratio from about 3.0 to about 8.0 ppm/mol % (ppm of hydrogen per mol % of ethylene). Hexene was controlled to maintain the hexene to ethylene mole ratio as shown in the tables below. The concentrations of all the gases were measured by an on-line gas chromatograph to ensure relatively constant composition in the recycle gas stream.

The catalyst was injected directly into the fluidized bed using nitrogen as a carrier. Its rate was adjusted to maintain a constant production rate. The reacting bed of growing polymer particles was maintained in a fluidized state by the continuous flow of the make-up feed and recycle gas through the reaction zone. Superficial gas velocities of 1.9 to about 2.4 feet/sec were used to achieve this. The reactor was operated at a total pressure of about 349 psig. The reactor was operated at various reaction temperatures of from 75-105° C.

The fluidized bed was maintained at a constant height (about 6.4 to about 7.1 feet) above the distributor plate by withdrawing a portion of the bed at a rate equal to the rate of formation of particulate product. The rate of product formation (the polymer production rate) was in the range of about 23 to about 52 lb/hr. The product was removed semi-continuously via a series of valves into a fixed volume chamber. Table 1A summarizes the reactor and polymerization conditions and Table 1B reports the resin properties.

TABLE 1A

Polymerization conditions

| | Run Part No | | | | |
|---|---|---|---|---|---|
| | 1 | 2 | 3 | 4 | 5 |
| | Run Description | | | | |
| | Mid IC5, Mid MI, Mid RT | Lo RT, Lo IC5, Lo MI | Hi RT, Lo IC5, Hi MI | Hi RT, Hi IC5, Hi MI | LoRT, Hi IC5, LO MI |
| Prod Rate (lbs/hr) | 35.67 | 48.25 | 24.48 | 27.50 | 51.75 |
| STY (lb/hr/ft^3)* | 5.2268 | 7.4706 | 3.9598 | 4.4521 | 7.9912 |
| Residence Time (hrs) | 3.04 | 2.19 | 4.21 | 3.59 | 1.92 |
| C2 Partial Pressure (psia) | 199.24 | 199.93 | 200.02 | 199.67 | 200.01 |
| H2/C2 Conc Ratio (ppm/m %) | 4.51 | 2.81 | 5.10 | 7.02 | 3.49 |
| C6/C2 Conc Ratio (m/m) | 0.0161 | 0.0156 | 0.0165 | 0.0152 | 0.0146 |
| Isopentane (mol %) | 6.25 | 1.80 | 2.38 | 11.88 | 11.48 |
| RX Pressure (psig) | 348.35 | 348.22 | 348.25 | 348.44 | 348.47 |
| Rxn Temperature (° C.) | 78.00 | 77.00 | 78.00 | 78.00 | 78.00 |
| Gas Velocity (ft/sec) | 2.17 | 2.12 | 2.09 | 2.11 | 2.10 |
| Bed Weight (lbs) | 109 | 105 | 103 | 99 | 99 |
| Bed Level (ft) | 7.13 | 6.75 | 6.46 | 6.45 | 6.76 |
| Fluid Bulk Density (lb/ft3) | 15.99 | 16.37 | 16.76 | 16.05 | 15.29 |

| | Run Part No | | | | |
|---|---|---|---|---|---|
| | 6 | 7 | 8 | 9 | 10 |
| | Run Description | | | | |
| | Lo RT, HI IC5, HI MI | Hi RT, Lo MI, Lo IC5 | Lo RT, Lo IC5, Hi MI | Lo MI, Hi IC5, HRT | Center Point Repeat |
| Prod Rate (lbs/hr) | 51.92 | 25.33 | 50.08 | 23.75 | 34.33 |
| STY (lb/hr/ft^3)* | 8.2057 | 4.1137 | 7.9131 | 3.8035 | 5.4506 |
| Residence Time (hrs) | 1.89 | 4.02 | 2.06 | 4.08 | 2.90 |
| C2 Partial Pressure (psia) | 200.40 | 199.96 | 200.03 | 200.63 | 200.00 |
| H2/C2 Conc Ratio (ppm/m %) | 6.58 | 2.70 | 4.84 | 3.93 | 4.00 |
| C6/C2 Conc Ratio (m/m) | 0.0148 | 0.0159 | 0.0157 | 0.0160 | 0.0157 |
| Isopentane (mol %) | 11.25 | 2.40 | 1.85 | 11.68 | 6.49 |
| RX Pressure (psig) | 348.47 | 348.25 | 348.27 | 348.44 | 348.36 |
| Rxn Temperature (° C.) | 78.00 | 78.00 | 77.00 | 78.00 | 78.00 |
| Gas Velocity (ft/sec) | 2.12 | 2.14 | 2.13 | 2.13 | 2.19 |
| Bed Weight (lbs) | 98 | 102 | 103 | 97 | 100 |
| Bed Level (ft) | 6.61 | 6.43 | 6.61 | 6.52 | 6.58 |
| Fluid Bulk Density (lb/ft3) | 15.54 | 16.58 | 16.41 | 15.60 | 15.87 |

*STY is Space Time Yield and is lb/hr production rate divided by the volume (ft^3) of the bed volume inside of the reactor. STY is inversely proportional to reactor residence time.

TABLE 1B

Resin Properties

| | Run Part No | | | | |
|---|---|---|---|---|---|
| | 1 | 2 | 3 | 4 | 5 |
| | Run Description | | | | |
| | Mid IC5, Mid MI, Mid RT | Lo RT, Lo IC5, Lo MI | Hi RT, Lo IC5, Hi MI | Hi RT, Hi IC5, Hi MI | LoRT, Hi IC5, LO MI |
| Melt Index (I2, dg/min) | 0.46 | 0.24 | 0.97 | 0.98 | 0.23 |
| High Load Melt Index (I21, dg/min) | 13.25 | 6.42 | 27.19 | 27.86 | 6.26 |
| MFR (HLMI/MI) | 28.9 | 26.4 | 28.0 | 28.3 | 26.9 |
| Polymer Density (g/cm^3) | 0.9145 | 0.9150 | 0.9157 | 0.9156 | 0.9152 |
| Bulk Density (lb/ft^3) | 27.70 | 27.10 | 26.93 | 28.50 | 27.77 |
| Screen APS (in) | 0.0339 | 0.0296 | 0.0355 | 0.0348 | 0.0312 |

TABLE 1B-continued

Resin Properties

| | Run Part No | | | | |
|---|---|---|---|---|---|
| | 6 | 7 | 8 | 9 | 10 |
| | Lo RT, HI IC5, HI MI | Hi RT, Lo MI, Lo IC5 | Lo RT, Lo IC5, Hi MI | Lo MI, Hi IC5, HRT | Center Point Repeat |
| Melt Index (I2, dg/min) | 0.99 | 0.25 | 1.03 | 0.23 | 0.47 |
| High Load Melt Index (I21, dg/min) | 26.25 | 6.56 | 27.70 | 7.06 | 13.01 |
| MFR (HLMI/MI) | 26.5 | 26.5 | 26.9 | 30.9 | 27.6 |
| Polymer Density (g/cm$^3$) | 0.9149 | 0.9155 | 0.9162 | 0.9155 | 0.9159 |
| Bulk Density (lb/ft$^3$) | 28.30 | 26.92 | 27.03 | 28.10 | 27.27 |
| Screen APS (in) | 0.0320 | 0.0332 | 0.0317 | 0.0348 | 0.0324 |

TABLE 1C

Extruded conditions and resin properties

| Exp. Part | Granule MI (dg/min) | iC5 (mol %) | RT (h) | Torque (%) | Zone 6 (F) | Zone 7 (F) | Melt (F) | Head Press (PSI) | Die Press (PSI) | TDA (ppm) | Pellet MI (dg/min) |
|---|---|---|---|---|---|---|---|---|---|---|---|
| Part 1 Midpoint | 0.43 | 6.2 | 3.0 | 64.5 | 382 | 484 | 448 | 1141 | 448 | 63 | 0.47 |
| Part 2 low MI, low iC5, low RT | 0.25 | 1.8 | 2.2 | 77.1 | 385 | 376 | 470 | 1413 | 752 | 117 | 0.26 |
| Part 3 high MI, low iC5, high RT | 0.95 | 2.4 | 4.1 | 52.4 | 381 | 457 | 415 | 917 | 415 | 67 | 0.93 |
| Part 4 high MI, high iC5, high RT | 1.02 | 12.0 | 3.5 | 58.8 | 369 | 380 | 406 | 1038 | 406 | 43 | 0.90 |
| Part 5 low MI, high iC5, low RT | 0.23 | 11.5 | 2.0 | 82.5 | 398 | 380 | 475 | 1484 | 788 | 181 | 0.23 |
| Part 6 high MI, high iC5, low RT | 0.93 | 11.0 | 2.0 | 58.2 | 373 | 425 | 417 | 1004 | 417 | 61 | 0.87 |
| Part 7 low MI, low iC5, high RT | 0.23 | 2.4 | 3.7 | 76.2 | 390 | 370 | 480 | 1437 | 764 | 162 | 0.22 |
| Part 8 high MI, low iC5, low RT | 0.98 | 1.9 | 2.0 | 56.2 | 371 | 416 | 407 | 994 | 565 | 56 | 0.96 |
| Part 9 low MI, high iC5, high RT | 0.23 | 11.7 | 3.7 | 76.7 | 393 | 378 | 473 | 1365 | 723 | 13 | 0.22 |
| Part 10 Midpoint | 0.45 | 6.5 | 2.9 | 66.1 | 376 | 365 | 446 | 1186 | 639 | 50 | 0.42 |

Figure 2:
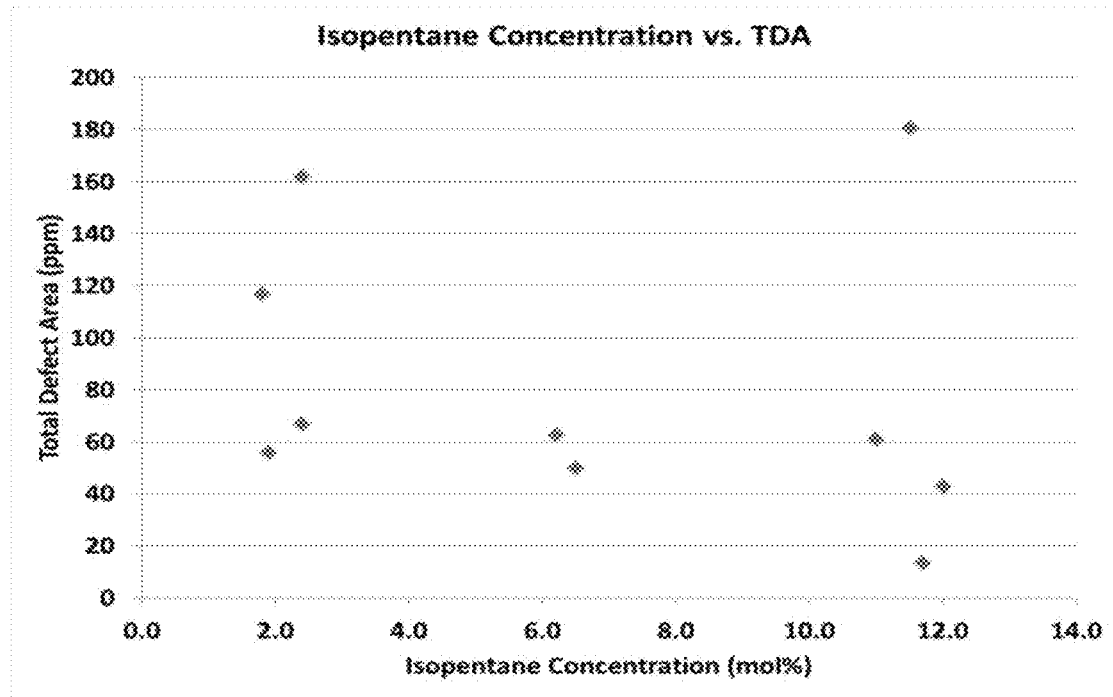
FIG. 2 is a plot showing the relationship between isopentane concentration and TDA of the polymer obtained in Example 1, according to one or more embodiments described.
Figure 3:
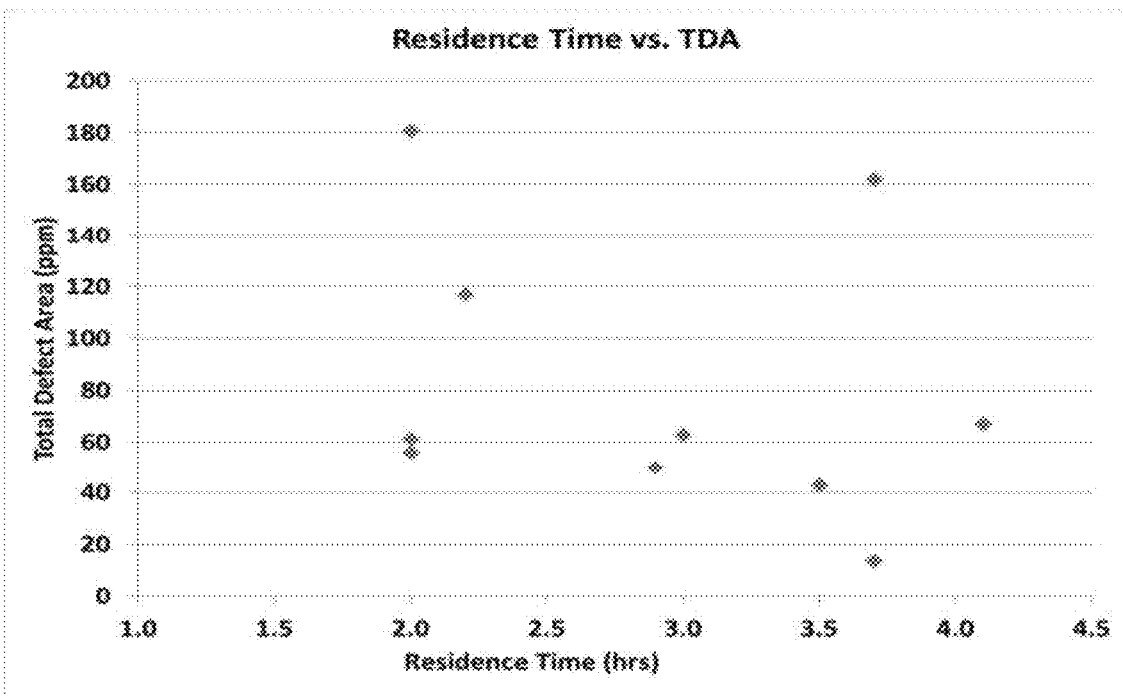
FIG. 3 is a plot showing the relationship between residence time and TDA of the polymer obtained in Example 1, according to one or more embodiments described.
Figure 4:
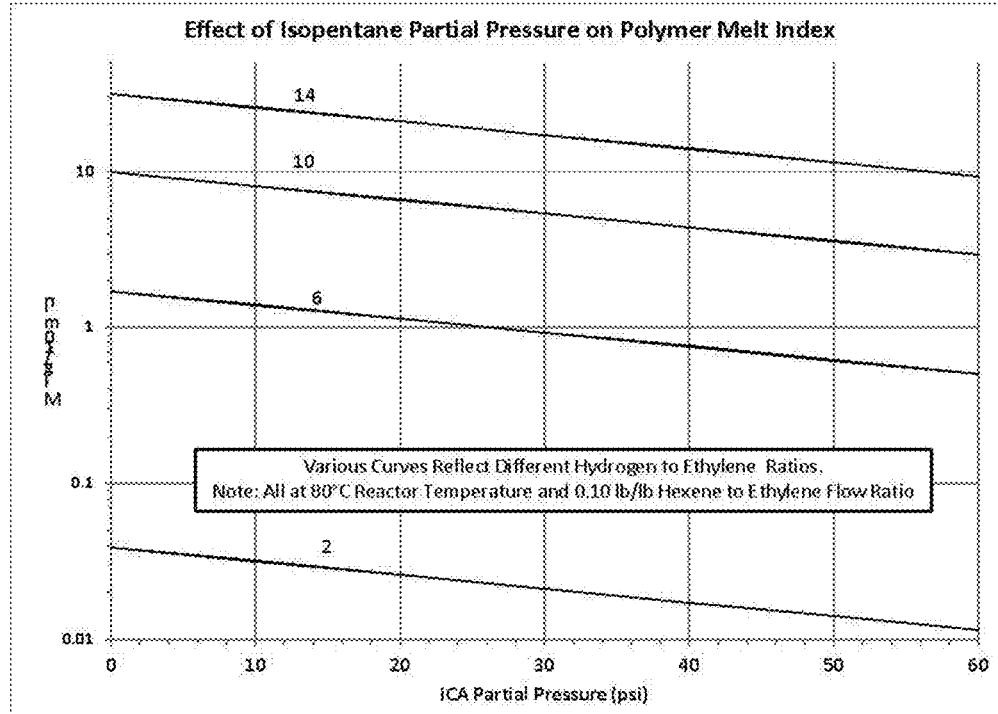
FIG. 4 is a plot showing the relationship between the polymer melt index and isopentane concentration of the polymer obtained in Example 1, according to one or more embodiments described.

FIG. 1 is a plot showing the relationship between MI and TDA. FIG. 2 is a plot showing the relationship between isopentane concentration and TDA. FIG. 3 is a plot showing the relationship between residence time and TDA. FIG. 4 is a plot showing the relationship between polymer melt index and isopentane concentration.

As shown in the data above and FIGS. 1-3, fractional MI resins had slightly higher melt temperature, but there was no degradation of the polymer as indicated by melt index remaining the same pre and post extrusion. The data above and FIGS. 1-3 also show there is a potential for gels to increase as melt index decreases below 0.5 MI. It was further discovered that steady state isopentane concentration and residence time do not affect gels, but isopentane concentration can indirectly influence the formation of gels if there is a rapid increase in isopentane concentration causing the MI to drop below 0.5 g/10 min (I$_2$) without properly adjusting hydrogen concentration, e.g., increasing the hydrogen concentration if the melt index decreases, as shown in FIG. 4.

Example 2

Low MI (high Mw) polyethylene was added to relatively high MI (low Mw) polyethylene resin to evaluate the formation of gels in a twin-screw extruder used to melt homogenize a blend of materials with very different MI. This experiment was used to replicate situations that can arise within a reactor to varying degrees during transitions, bed level excursions, H$_2$ loss, etc.

Granular resin (about 1 MI) was mixed with granular resin (about 0.2 MI) and compounded on ZSK 57 mm TSE at 80 lb/h and 125 or 175 rpm using PE screw. 100% of the 0.2 MI granular resin was not compounded but was later shown to have TDA=181 ppm, when extruded under similar conditions (100 lb/h and 150 rpm). TDA values increased quite dramatically when the two different granular resins as described above were mixed. Increasing screw speed at constant throughput had a negligible effect on gel frequency. The blend compositions and resulting TDA is reported in Table 2 below.

TABLE 2

Blend compositions

| Sample | Screw RPM | TDA (ppm) |
|---|---|---|
| 100% 1.0 MI | 125 | 52 |
| 0% 0.2 MI | 175 | 47 |
| 95% 1.0 MI | 125 | 4787 |
| 5% 0.2 MI | 175 | 3548 |
| 90% 1.0 MI | 125 | 6094 |
| 10% 0.2 MI | 175 | 5485 |

Example 3

This example tested the effect of a grade transition from one target MI/density to another grade within a reactor. The reactor was a continuous pilot-scale gas phase fluidized bed reactor with a height of 10 ft and a diameter of 2 ft (L/D ratio=5.0). The flowrate of the cycle gas was about 30,000 lb/hr with a gas velocity of 2.1 ft/sec. The reactor was lined out at 0.2 MI. The reactor was then transitioned to 1 MI and product was collected at various intervals. Table 3 summarizes the polymerization conditions and resin properties.

Figure 5:
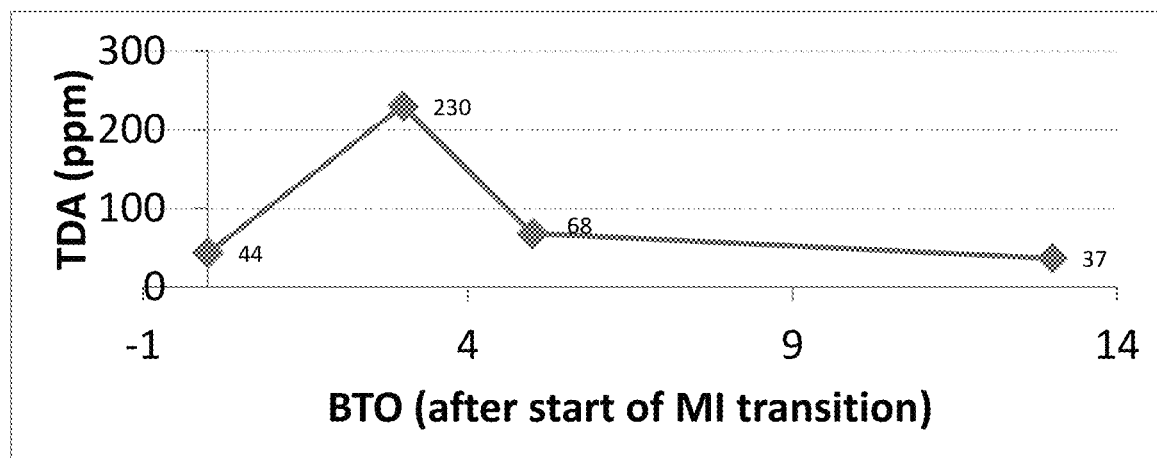
FIG. 5 is a plot showing the relationship between TDA and BTO obtained in Example 3, according to one or more embodiments described.

Total defect area (TDA) spiked from 43 ppm at the start of the transition to 230 ppm at 3 BTO (~2% 0.2 MI), then decreased to 37 ppm at 13 BTO (100% 1 MI). FIG. 5 shows the relationship between TDA and BTO. Bed Turnovers ("BTO") is the production rate divided by the reactor bed weight. This term is often used to express how much time has passed relative to an event that affects the reactor.

This example discovered that small amounts of dissimilar resin will increase gels in a reactor bed, and grade transitions with different melt index targets can cause an increase in gels that requires about 5 BTOs to clear.

The equipment and methodology for conducting tests and describing OCS results may be found in the Example Section of U.S. Pat. No. 7,393,916.

TABLE 3

Example 3 polymerization conditions and resin properties

| Description | 0.2 MI to 1.0 MI Transition | 0.2 MI to 1.0 MI Transition | 0.2 MI to 1.0 MI Transition |
|---|---|---|---|
| Bed Turnovers (whole part) | 3.31 | 4.96 | 13.37 |
| Residence Time | N/A | N/A | 3.49 |
| C2 Partial Pressure (psia) | 201 | 201 | 201 |
| H2/C2 Analyzer Ratio (ppm/mol %) | 4.57 | 4.51 | 4.96 |
| C6/C2 Analyzer Ratio | 0.0156 | 0.0157 | 0.0160 |
| IC5 (mol %) | 2.4 | 2.4 | 2.4 |
| Reactor Pressure (psia) | 314.2 | 314.0 | 314.1 |
| Bed Temperature (° F.) | 172.4 | 172.4 | 172.4 |
| Gas Velocity (ft/sec) | 2.10 | 2.10 | 2.10 |
| Bed Weight (lbs) | 519.0 | 515.4 | 524.9 |
| Bed Level (ft) | 10.4 | 10.2 | 10.4 |
| Production Rate (lb/hr) Drops | 153.0 | 153.0 | 150.5 |
| Melt Index (I2) | 0.53 | 0.63 | 0.77 |
| HLMI (I21) | 14.89 | 18.41 | 22.89 |
| MFR (I21/I2) | 28.18 | 29.15 | 29.73 |
| Density (gm/cc) | 0.9179 | 0.9179 | 0.9179 |
| OCS TDA (ppm) | 230.0 | 68.0 | 37.0 |

Example 4

Figure 6:
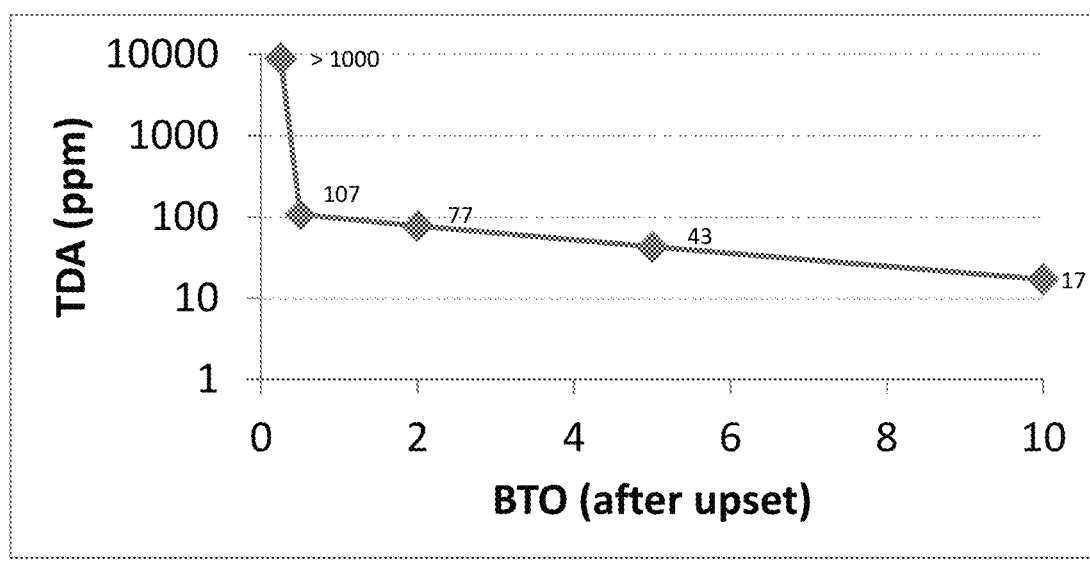
FIG. 6 is a plot showing the relationship of TDA versus BTO obtained in Example 4, according to one or more embodiments described.

This example studied the effect of hydrogen flow, which leads to low instantaneous MI that can lead to gels. Instantaneous density also dropped as a result. Using the same reactor system in Example 3, decreasing $H_2$ flow (inst. MI=0.1) for 0.3 BTO while producing 0.5 MI/0.9165 D/28 MIR did not increase TDA. Shutting off $H_2$ (instantaneous MI=0.05) for 0.5 BTO, a more severe test, led to significant increase in gel frequency. The Total Defect Area (TDA) increased to >1,000 ppm, then dropped rapidly but took more than 5 BTO to clear as shown in FIG. 6, which shows the relationship of TDA versus BTO of this experiment.

TABLE 4

Example 4 polymerization conditions and resin properties

| Description | Low Hydrogen Upset | Low Hydrogen Drum #1 | Low Hydrogen Drum #2 | Low Hydrogen Drum #3 | Low Hydrogen Drum #4 | Low Hydrogen Upset #2 | Low Hydrogen #2 Drum #1 |
|---|---|---|---|---|---|---|---|
| Bed Turnovers (whole part) | 0.53 | 0.97 | 2.31 | 5.17 | 10.42 | 0.00 | 0.56 |
| Residence Time | 3.79 | N/A | N/A | 3.82 | 3.78 | N/A. | N/A |
| C2 Partial Pressure (psia) | 202 | 201 | 201 | 201 | 201 | 201 | 200 |
| H2/C2 Analyzer Ratio (ppm/mol %) | 3.70 | 3.99 | 3.92 | 3.88 | 3.81 | 3.77 | 3.66 |
| C6/C2 Analyzer Ratio | 0.0158 | 0.0155 | 0.0154 | 0.0157 | 0.0158 | 0.0158 | 0.0159 |
| IC5 (mol %) | 2.4 | 2.4 | 2.5 | 2.4 | 2.4 | 2.4 | 2.4 |
| Reactor Pressure (psia) | 314.3 | 314.2 | 314.5 | 314.3 | 314.4 | 314.4 | 314.0 |
| Bed Temperature (° F.) | 172.0 | 172.0 | 172.3 | 172.2 | 172.2 | 172.2 | 173.4 |

TABLE 4-continued

Example 4 polymerization conditions and resin properties

| Description | | | | | | | |
|---|---|---|---|---|---|---|---|
| Gas Velocity (ft/sec) | 2.10 | 2.10 | 2.10 | 2.09 | 2.10 | 2.10 | 2.10 |
| Bed Weight (lbs) | 582.3 | 583.0 | 582.9 | 584.4 | 584.4 | 589.7 | 585.4 |
| Bed Level (ft) | 11.5 | 11.6 | 11.7 | 11.5 | 11.5 | 11.6 | 11.6 |
| Production Rate (lb/hr) Drops | 153.5 | 153.0 | 153.0 | 153.0 | 154.5 | 152.0 | 150.0 |
| Melt Index (I2) | | 0.57 | 0.53 | 0.54 | 0.55 | 0.55 | 0.53 |
| HLMI (I21) | 16.02 | 16.08 | 15.86 | 14.87 | 15.10 | 14.18 | 14.76 |
| MFR (I21/I2) | 28.06 | 28.10 | 29.98 | 27.48 | 27.36 | 25.78 | 28.06 |
| Density (gm/cc) | 0.9175 | 0.9178 | 0.9175 | 0.9171 | 0.9173 | 0.9166 | 0.9176 |
| OCS TDA (ppm) | N/A | 10.4 | 11.3 | 14.9 | N/A | N/A | N/A |

| Description | Low Hydrogen #2 Drum #2 | Low Hydrogen #2 Drum #3 | Hydrogen Off Upset | Hydrogen Off Drum #1 | Hydrogen Off Drum #2 | Hydrogen Off Drum #3 | Hydrogen Off Drum #4 | Hydrogen Off Drum #5 |
|---|---|---|---|---|---|---|---|---|
| Bed Turnovers (whole part) | 2.16 | 4.86 | 0.52 | 0.52 | 0.93 | 2.33 | 5.22 | 9.41 |
| Residence Time | N/A | 3.96 | 3.86 | N/A | N/A | N/A | 3.58 | 4.21 |
| C2 Partial Pressure (psia) | 202 | 201 | 201 | 203 | 198 | 201 | 201 | 200 |
| H2/C2 Analyzer Ratio (ppm/mol %) | 3.97 | 3.83 | 2.67 | 1.86 | 3.62 | 3.95 | 3.88 | 3.83 |
| C6/C2 Analyzer Ratio | 0.0156 | 0.0157 | 0.0158 | 0.0160 | 0.0156 | 0.0153 | 0.0156 | 0.0155 |
| IC5 (mol %) | 2.4 | 2.4 | 2.4 | 2.4 | 2.5 | 2.4 | 2.4 | 2.4 |
| Reactor Pressure (psia) | 314.6 | 314.5 | 314.3 | 314.3 | 313.3 | 314.3 | 314.0 | 314.5 |
| Bed Temperature (° F.) | 171.9 | 172.2 | 171.9 | 171.9 | 172.3 | 172.2 | 172.2 | 172.3 |
| Gas Velocity (ft/sec) | 2.10 | 2.10 | 2.10 | 2.10 | 2.10 | 2.11 | 2.10 | 2.10 |
| Bed Weight (lbs) | 581.4 | 584.2 | 584.1 | 584.0 | 585.5 | 583.0 | 585.6 | 587.1 |
| Bed Level (ft) | 11.6 | 11.7 | 11.5 | 11.5 | 11.3 | 11.5 | 11.3 | 11.5 |
| Production Rate (lb/hr) Drops | 148.0 | 147.5 | 151.5 | 153.0 | 155.0 | 158.0 | 163.5 | 139.5 |
| Melt Index (I2) | 0.56 | 0.54 | 0.60 | 0.40 | 0.40 | 0.34 | 0.54 | 0.57 |
| HLMI (I21) | 14.68 | 14.34 | 16.76 | 11.23 | 11.23 | 9.51 | 15.07 | 14.95 |
| MFR (I21/I2) | 26.27 | 26.56 | 27.74 | 28.36 | 28.36 | 27.97 | 27.86 | 26.41 |
| Density (gm/cc) | 0.9175 | 0.9163 | 0.9177 | 0.9176 | 0.9176 | 0.9162 | 0.9168 | 0.9165 |
| OCS TDA (ppm) | N/A | N/A | N/A | 8964.0 | 107.0 | 77.0 | 43.0 | 17.0 |

Example 5

Figure 7:
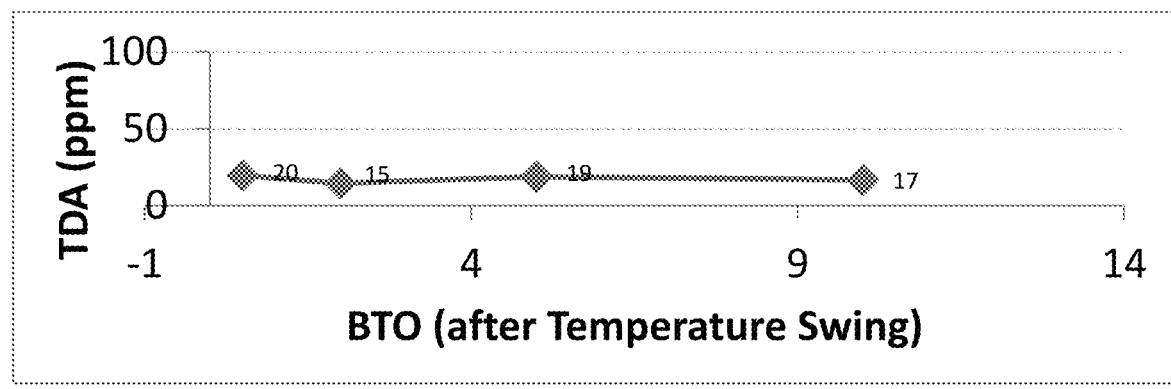
FIG. 7 is a plot showing the relationship of TDA versus BTO obtained in Example 5, according to one or more embodiments described.

Swings in bed temperature can affect instantaneous MI/MIR and, if severe enough, can potentially impact film quality. This example studied the effect of bed temperature on gel formation. The target bed temperature was 171° F. within the reactor of Example 3. Bed temperature was cycled +/−10° F. for 2 h (~0.5 BTO) while producing 0.5 MI/0.9165 D/28 MIR grade; product was collected at various intervals. The Total defect area (TDA) was unaffected as shown in FIG. 7.

TABLE 5

Example 5 polymerization conditions and resin properties

| Description | Temperature Swing Upset | Temp Swing Drum #1 | Temp Swing Drum #2 | Temp Swing Drum #3 | Temp Swing Drum #4 |
|---|---|---|---|---|---|
| Bed Turnovers (whole part) | 0.93 | 1.41 | 3.35 | 6.33 | 9.80 |
| Residence Time | 4.31 | 4.22 | 4.16 | 4.26 | N/A |
| C2 Partial Pressure (psia) | 198 | 200 | 202 | 200 | 202 |
| H2/C2 Analyzer Ratio (ppm/mol %) | 3.89 | 3.85 | 3.94 | 3.82 | 3.99 |
| C6/C2 Analyzer Ratio | 0.0158 | 0.0158 | 0.0158 | 0.0157 | 0.0153 |
| IC5 (mol %) | 2.4 | 2.4 | 2.4 | 2.5 | 2.4 |
| Reactor Pressure (psia) | 309.8 | 314.0 | 314.5 | 314.3 | 314.5 |
| Bed Temperature (° F.) | 172.8 | 172.4 | 172.1 | 172.4 | 172.2 |
| Gas Velocity (ft/sec) | 2.10 | 2.10 | 2.10 | 2.10 | 2.10 |
| Bed Weight (lbs) | 583.4 | 579.9 | 586.2 | 585.7 | 582.5 |

TABLE 5-continued

Example 5 polymerization conditions and resin properties

| Description | Temperature Swing Upset | Temp Swing Drum #1 | Temp Swing Drum #2 | Temp Swing Drum #3 | Temp Swing Drum #4 |
|---|---|---|---|---|---|
| Bed Level (ft) | 11.3 | 11.3 | 11.5 | 11.6 | 11.4 |
| Production Rate (lb/hr) Drops | 135.5 | 137.5 | 141.0 | 137.5 | N/A |
| Melt Index (I2) | 0.60 | 0.60 | 0.60 | 0.54 | 0.63 |
| HLMI (I21) | 16.44 | 16.44 | 16.02 | 14.21 | 17.03 |
| MFR (I21/I2) | 27.40 | 27.40 | 26.70 | 26.32 | 27.03 |
| Density (gm/cc) | 0.9168 | 0.9168 | 0.9170 | 0.9162 | 0.9173 |
| OCS TDA (ppm) | N/A | 20.0 | 15.0 | 19.0 | 17.0 |

Example 6

Figure 8:
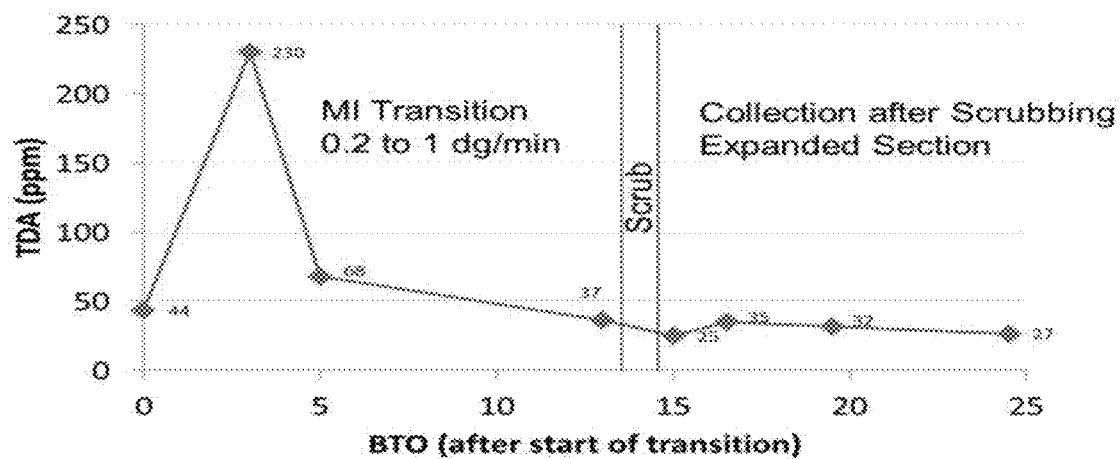
FIG. 8 is a plot showing the relationship of TDA versus BTO obtained in Example 6, according to one or more embodiments described.

This example studied the effect of bed height on gel formation. The same reactor as used in Example 3 was lined out at 0.2 MI. Bed level was raised to 4-6" above the neck for 2 BTOs in an attempt to build up a "crust", then dropped back to below the neck for 5 BTOs. After the reactor lined out at 1 MI (TDA=37 ppm), the bed level of the 1.0 MI resin was raised above the neck for 1.5 BTOs to scrub any "crust" of the 0.2 MI resin. The bed height was returned to level below the neck, and product was collected at various intervals. The total defect area (TDA) remained relatively constant as shown in FIG. 8.

TABLE 6

Example 6 polymerization conditions and resin properties

| Description | Exp Section Scrub Upset | Exp Section Scrub Drum #1 | Exp Section Scrub Drum #2 | Exp Section Scrub Drum #3 | Exp Section Scrub Drum #4 |
|---|---|---|---|---|---|
| Bed Turnovers (whole part) | 1.47 | 0.64 | 2.51 | 5.34 | 10.90 |
| Residence Time | 4.94 | 6.14 | 2.84 | 3.56 | 3.84 |
| C2 Partial Pressure (psia) | 201 | 200 | 203 | 201 | 201 |
| H2/C2 Analyzer Ratio (ppm/mol %) | 4.87 | 4.85 | 5.19 | 4.99 | 4.97 |
| C6/C2 Analyzer Ratio | 0.0160 | 0.0160 | 0.0158 | 0.0155 | 0.0158 |
| IC5 (mol %) | 2.3 | 2.4 | 2.2 | 2.3 | 2.4 |
| Reactor Pressure (psia) | 314.4 | 314.5 | 313.5 | 314.4 | 314.1 |
| Bed Temperature (° F.) | 172.4 | 172.4 | 172.0 | 172.4 | 172.4 |
| Gas Velocity (ft/sec) | 2.10 | 2.10 | 2.10 | 2.10 | 2.10 |
| Bed Weight (lbs) | 736.0 | 665.9 | 599.5 | 519.3 | 518.1 |
| Bed Level (ft) | 13.8 | 12.5 | 11.6 | 10.1 | 10.2 |
| Production Rate (lb/hr) Drops | 149.0 | 108.5 | 211.0 | 146.0 | 135.0 |
| Melt Index (I2) | 1.06 | 1.05 | 1.10 | 1.10 | 1.04 |
| HLMI (I21) | 27.72 | 28.38 | 31.30 | 30.68 | 27.58 |
| MFR (I21/I2) | 28.04 | 27.03 | 28.20 | 27.89 | 26.52 |
| Density (gm/cc) | 0.9174 | 0.9166 | 0.9171 | 0.9167 | 0.9163 |
| OCS TDA (ppm) | N/A | 25.0 | 35.0 | 32.0 | 27.0 |

Example 7

This example studied methods for reducing gels by controlling polyethylene granules size distribution. Removing small particles from a polyethylene granule before pelletization helped to reduce gels, whereas adding small particles to a polyethylene granules before pelletization increased gels. LLDPE granules were sieved with 3 different mesh screens, respectively, to obtain granules of different sizes. The mesh sizes of the screens were 20, 30 and 45 respectively. The resulting granules were named part 1 through part 4, with decreasing particle size.

Parts 1, 2 and 3 were compounded and pelletized to obtain pellet samples for OCS analyses. Part 4 (the fine) was added to Part 1 at different levels, and pelletized for OCS analyses. Table 7A below shows the actual particle size and Gel analysis results.

TABLE 7A

Particle size and OCS Gel analysis
Granules

| | Median particle size (um) | OCS GEL TDA (ppm) | | | | |
|---|---|---|---|---|---|---|
| | | Mini gels (<200 um) | Small gels (200-600 um) | Medium gels (600-1200 um) | Large gels (>1200 um) | All size TDA |
| Original | 828 | 99 | 73 | 2 | 0 | 174 |
| Part 1 | 1164 | 25 | 22 | 2 | 0 | 49 |
| Part 2 | 758 | 41 | 37 | 2 | 0 | 80 |
| Part 3 | 509 | 140 | 118 | 4 | 0 | 262 |
| 20% spiked with fine | — | 184 | 133 | 6 | 0 | 323 |
| 40% spiked with fine | — | 295 | 211 | 8 | 1 | 515 |
| 60% spiked with fine | — | 491 | 353 | 12 | 0 | 856 |

As shown in Table 7A, the polyethylene resin had a low number of OCS gels when smaller size particles were removed. When the fine was added to the large particles, the higher percentage of fine resulted in the higher OCS gels. It was discovered that uniform large size granules tended to have low OCS gel numbers. When fines were added to it, the higher percentage of the fine, the higher the OCS gel would be.

In this example, granules were physically sieved into different sizes as shown in Table 7B below. Other approaches to obtain relatively uniform and large granule size could have been used. Other approaches may include, but not limited to, tailoring the silica support size, controlling residence time, using additives that may help granules growth, etc.

TABLE 7B sieved particle distribution

| Part # | Description | Median size (um) | wt % |
|---|---|---|---|
| Original | not sieved | 828 | 100 |
| part 1 | on 20 mesh | 1164 | 38 |
| part 2 | on 30 mesh | 758 | 40 |
| part 3 | on 45 mesh | 509 | 14 |
| part 4 | pass 45 mesh | 337 | 8 |

TABLE 7C

MI and Density of Granules

| | Median size (um) | MI | HLMI | MIR ($I_{21}/I_2$) | Density |
|---|---|---|---|---|---|
| original | 828 | 0.4415 | 12.039 | 27.3 | 0.9189 |
| Part 1 | 1164 | 0.4203 | 11.802 | 28.1 | 0.9187 |
| Part 2 | 758 | 0.3973 | 11.125 | 28.0 | 0.9189 |
| Part 3 | 509 | 0.4486 | 12.373 | 27.6 | 0.9193 |
| Part 4 | 337 | — | — | — | — |

TABLE 7D

NMR measurements of comonomer frequency in the granules:

| | Median size (um) | Me/1000 C |
|---|---|---|
| Original | 828 | 12.9 |
| Part 1 | 1164 | 13.2 |
| Part 2 | 758 | 13.4 |

TABLE 7D-continued

NMR measurements of comonomer frequency in the granules:

| | Median size (um) | Me/1000 C |
|---|---|---|
| Part 3 | 509 | 12.5 |
| Part 4 | 337 | 11.9 |

Figure 9A:
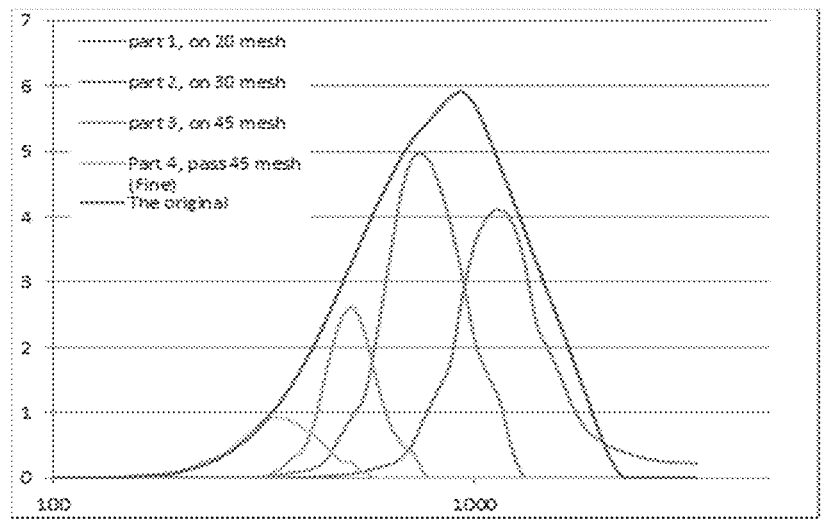
FIG. 9A depicts the Malvern PSD Analyses of the polymer parts identified in Table 6.
Figure 9B:
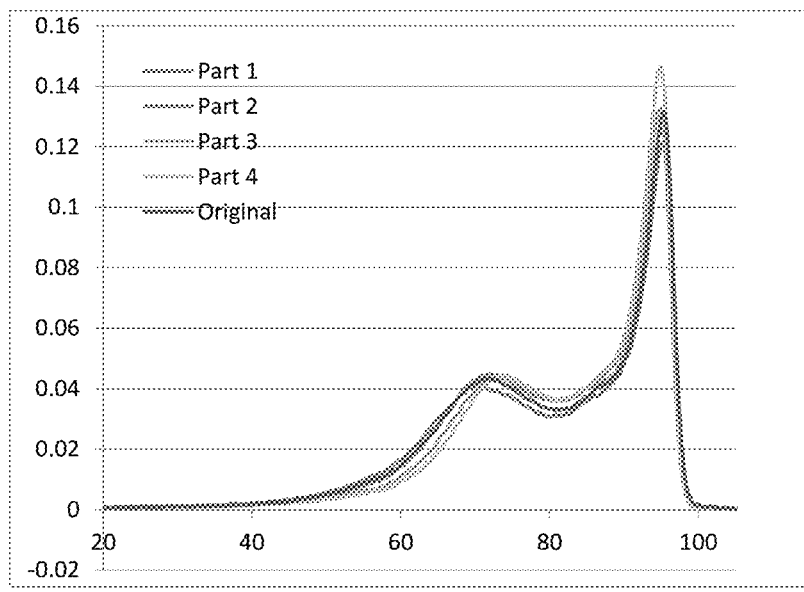
FIG. 9B is a TREF curve to show the granule size effect of the polymer parts identified in Table 6.

FIG. 9A depicts the Malvern PSD Analyses of the parts identified in Table 7B, and FIG. 9B is a TREF curve to show the granule size effect.

Example 8

Example 8 studied the effect of polymer supports versus silica supports using rac-Me$_2$Si(H$_4$Ind)$_2$ZrCl$_2$. Conventional metallocene catalysts used in gas phase PE reactors are typically prepared on silica supports. These catalysts are known to be sensitive to dome sheeting, unless additives (such as AS-990) are fed simultaneously to the reactor. The metallocene catalysts can also be prepared on polymer supports. As shown below, the polymer supported catalysts are less sensitive to dome sheeting, and can be run in gas phase reactors without an additive.

The polymer supported catalyst showed improved operability relative to silica supported catalyst, with reduced entrainment static and reduced potential for dome sheeting. The polymer supported catalyst did not require an additive to prevent dome sheeting. The polymer supported catalyst also exhibited approximately 25% higher zirconium productivity.

The lower static levels with the polymer supported catalyst may allow production of FMI (fractional MI) products in the fluid bed reactor (which is not possible with standard metallocene catalysts supported on silica).

Catalyst Preparation

Two batches of polymeric supported metallocene catalyst were prepared. The support material for both batches was Rohm and Haas grade M300SOG. This material was a polydivinylbenzene resin, functionalized with epoxide groups. Data on the support material is summarized below in Table 8.

TABLE 8

Physical Properties of the Polymer Support Material

| | |
|---|---|
| Average Particle Size (microns) | 45 |
| Surface Area (m$^2$/g) | 700 |
| Pore Diameter (Angstroms) | 450 |
| Pore Volume (cc/g) | 2.0 |
| Degree of Functionalization (mmol/g) | 0.6-2.0 |

Additional details of the polymer supports can be found in U.S. Pat. No. 6,743,873 B2 and U.S. Publication No. 2003/0224928 A1.

Batch 1 was prepared by slurrying 217.5 g of the M300SOG support with a solution or 320 g of anhydrous toluene and 256 g of 30 wt % MAO from Albemarle. The mixture was paddle stirred for approximately 60 minutes to ensure complete swelling of the polymeric support. To this, a solution of 4.97 g rac-Me$_2$Si(H$_4$Ind)$_2$ZrCl$_2$ in 70 ml of anhydrous toluene was slowly added. The flask containing the transition metal compound solution was rinsed with 40 ml toluene and also added. Paddle stirring was continued for 4 hours. After this time period, vacuum was applied for 24 hours to remove volatiles, and yielding 315.3 g of a free flowing supported catalyst. This batch demonstrated good flowability, and was subsequently tested in a pilot plant fluid bed reactor.

Batch 2 was prepared somewhat differently. This batch was prepared by first mixing (with a paddle stirrer) 493 g of anhydrous toluene with 491 g or 30 wt % MAO from Albemarle. To this, 9.5 g of rac-Me$_2$Si(H$_4$Ind)$_2$ZrCl$_2$ in 150 ml of anhydrous toluene was slowly added, followed by 100 ml of anhydrous toluene to rinse the transition metal vessel. This was stirred for 1 hour prior to adding 400 g of the functionalized polymer support (M300SOG) over a period of 30 minutes. This mixture was paddle stirred for 1 hour prior to applying vacuum to remove the volatiles. Vacuum drying was continued for a period of 12 hours, and produced what appeared to be a "free flowing" supported catalyst with a calculated yield of 557 g. However, this batch did not demonstrate good flowability, and it was therefore not possible to test it with the conventional dry catalyst feeder in the pilot plant.

Calculated metals content (based on the amounts added and the theoretical weight of the support) as shown in Table 9.

TABLE 9

Metal Contents of Standard and Polymer Supported Catalysts

| | Metallocene supported with Silica | Batch 1 | Batch 2 |
|---|---|---|---|
| Aluminum (g/g catalyst) | 0.113 | 0.119 | 0.123 |
| Zirconium (g/g catalyst) | 0.0029 | 0.00330 | 0.00339 |

The catalyst with good flowability (Batch 1) was used to test operability in a fluid bed reactor. A drawing of the pilot plant reactor system is provided in FIG. 11, and some of the key results are provided in FIGS. 12 and 13.

Figure 11:
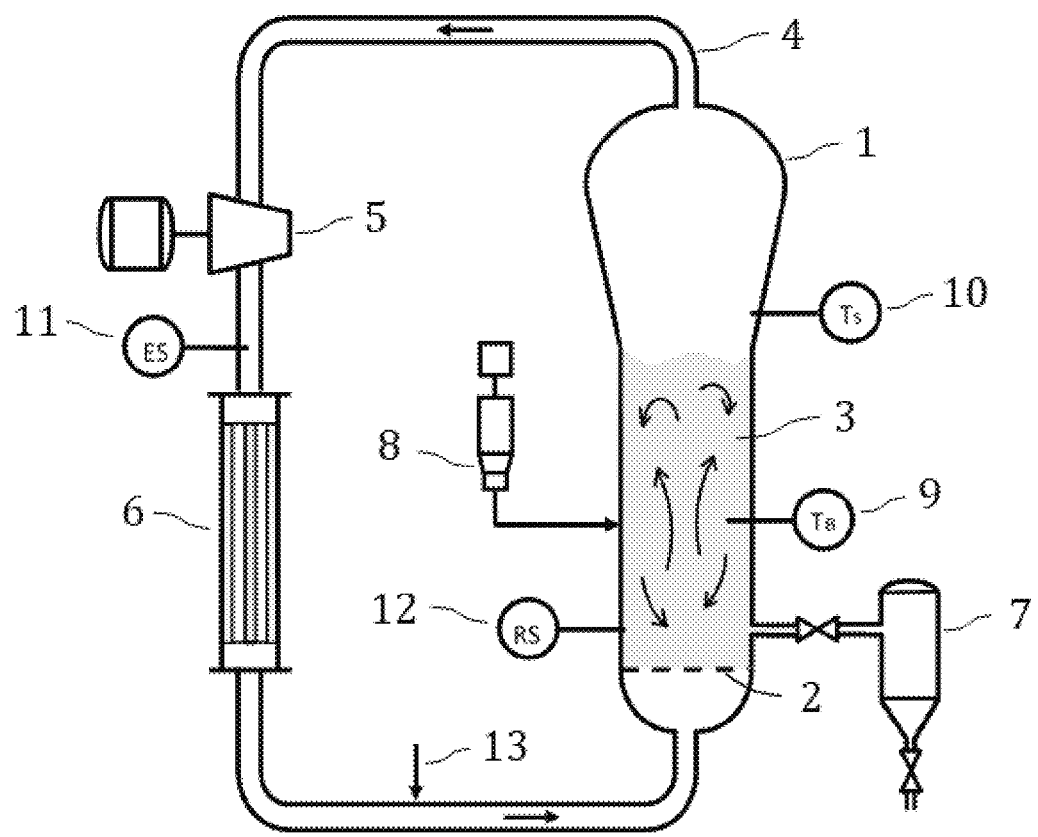
FIG. 11 is a schematic showing an illustrative reactor system, according to one or more embodiments described herein.

The reference numerals depicted in FIG. 11 correspond to the following:
1 Fluidized bed reactor
2 Distributor plate
3 Fluidized bed
4 Recycle line
5 Recycle compressor
6 Process heat exchanger
7 Product discharge system
8 Catalyst feeder
9 Bed temperature indicator, T$_B$
10 Wall temperature indicator ("skin temperature"), T$_S$
11 Entrainment static probe, ES
12 Reactor static probe, RS
13 Continuity additive feed (slurry of AS-990 in mineral oil)

Figure 12:
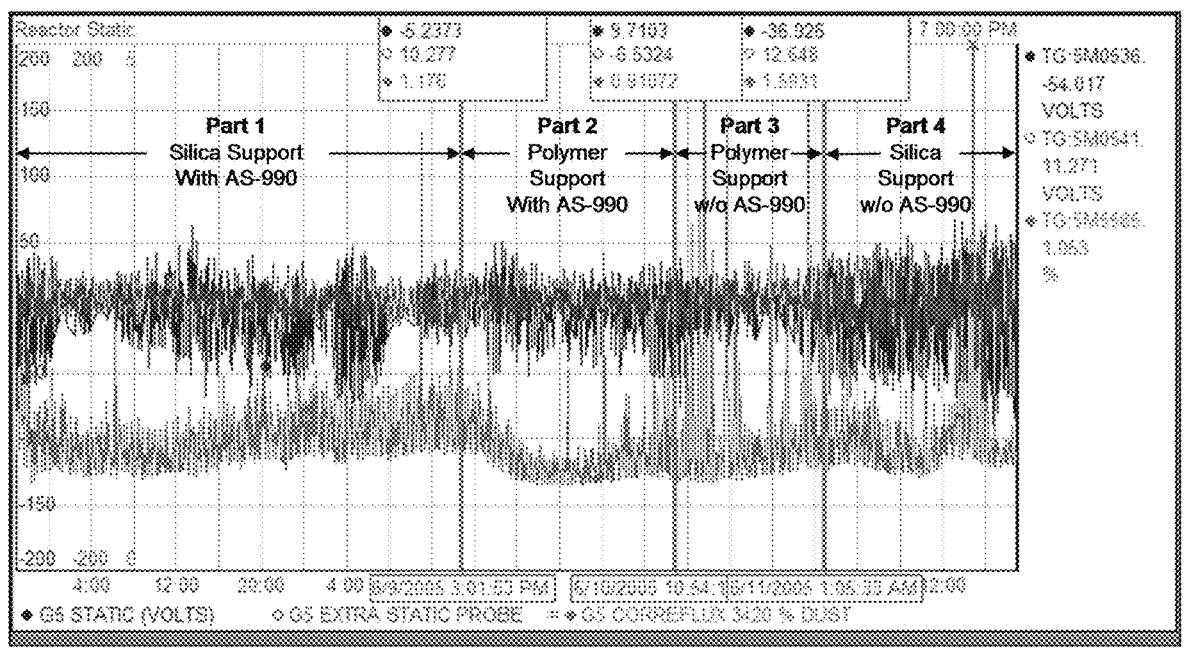
FIG. 12 is a graph depicting the entrainment static obtained in Example 8.

FIG. 12 shows the reactor static (the red and blue traces) and the entrainment static (brown trace) for all four parts of the pilot plant run. FIG. 12 shows the data from two skin temperature probes located in the expanded (conical) section of the reactor, at elevations of 7.5' and 9.5' above the distributor plate. The reactor static traces showed a narrowing of bandwidth with the polymer supported catalysts. The bandwidth increased considerably when the catalyst was changed back to the silica supported version.

The entrainment static showed approximately 40% reduction with the polymer supported catalyst. Note that the entrainment static remained low, even after the AS-990 was turned off. No dome sheets were produced with the polymer supported catalyst. A dome sheet was, however, produced with the silica supported catalyst.

The polymer supported catalyst showed improved operability in the reactor, with reduced tendency to form dome sheets, as compared to the silica supported control. While a continuous feed of AS-990 was required to prevent dome sheeting with the silica supported catalyst, the polymer supported catalyst operated successfully without the additive.

Part 1—Silica Supported XCAT™ EZ-100 Metallocene Catalyst (available from Univation Technologies, LLC, Houston, Tex.)

A pilot plant reactor was initially started and lined-out using a conventional, silica supported metallocene catalyst. Standard reaction conditions were maintained (temperature, ethylene partial pressure, C6/C2, etc.), and a granular product was produced. Product density was 0.9211 g/cm$^3$ density, and the melt index was 1.91 (I2). The additive of an ethoxylated stearyl amine, IRGASTAT™ AS-990 Additive, available from Huntsman International LLC, The Woodlands, TX (formerly Ciba Specialty Chemicals) was fed to the reactor as a 10 wt % solution in mineral oil to prevent dome sheeting. The feed rate was adjusted to maintain an approximately constant ratio of the additive feed and ethylene feed to the reactor. The target feed ratio was 30 ppmw. No dome sheets or other operability problems were encountered with Part 1.

Part 2—Polymer Supported Catalyst With AS-990

After lining out the reactor at standard conditions and producing the product sample in Part 1, the catalyst feed to the reactor was switched to the Batch 1 polymeric supported catalyst. AS-990 feed ratio to the reactor was maintained at 30 ppm based on the production rate of the polymer from the reactor. The reactor ran continuously at these conditions for 20 hours with no dome sheeting or other operability problems. A granular product sample of 0.9187 g/cm$^3$ density and 2.30 melt index (I$_2$) was produced.

Process performance of the polymer supported catalyst was similar to the conventional silica supported catalyst. There was little or no change in reaction conditions required to maintain catalyst productivity, resin density, and melt index. There was, however, an approximately 2 lb/ft$^3$ decrease in the fluidized bulk density (FBD). This result indicates that there was some change in the granular resin morphology with the polymer supported catalyst.

FIG. 12 shows that the bandwidth of the reactor static traces was reduced somewhat with the polymer supported catalyst. More significant was a reduction in entrainment static of approximately 40% (as indicated by the brown trace in FIG. 12). A reduction in entrainment static is indicative of a catalyst that is less prone to dome sheeting.

Part 3—Polymer Supported Catalyst

After 20 hours of continuous operation with the polymer supported catalyst, the AS-990 feed to the reactor was switched off, while other conditions in the reactor were maintained approximately constant. The reactor continued to run for approximately 10 hours with continued low entrainment static (FIG. 12), and no dome sheeting or other operability problems. This result is significant, because, as shown in the following example (Part 4) it is not possible to run the conventional silica supported catalyst without additive.

As can be seen in FIG. 12, the entrainment static remained low even after the AS-990 feed to the reactor was shut off. This indicates that AS-990 is not needed to maintain relatively low entrainment static.

Part 4—Silica Supported XCAT™ EZ-100 Metallocene Catalyst

Figure 13:
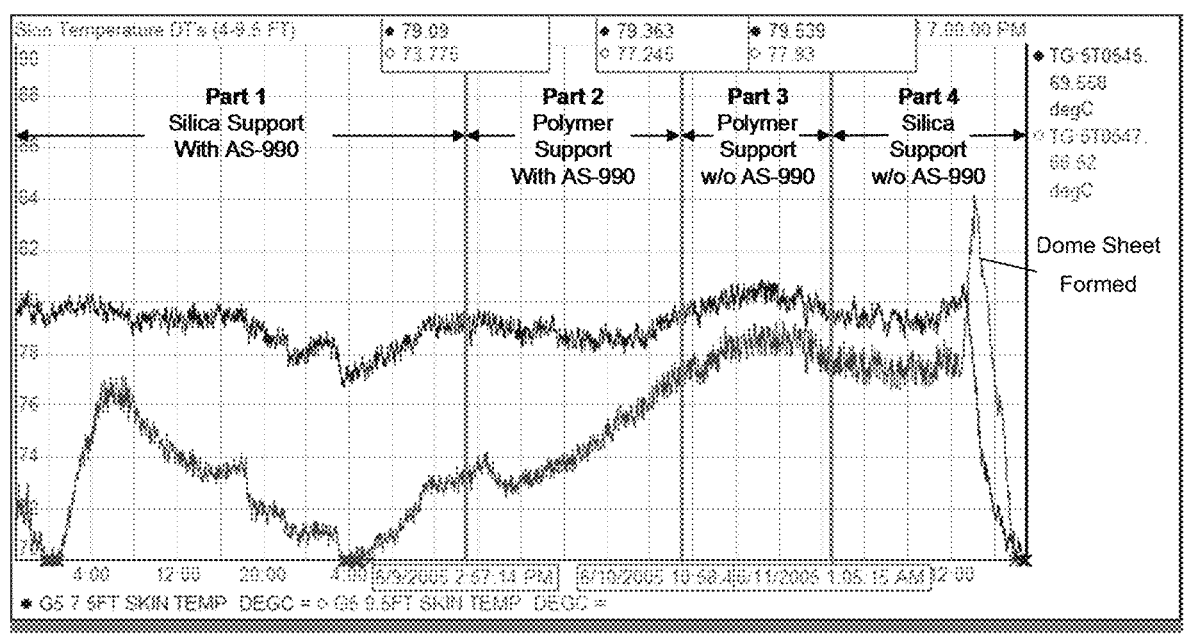
FIG. 13 is a graph depicting the expanded section wall temperature activity obtained from the pilot plant reactor in Example 8.

After 10 hours of continuous operation in Part 3, the catalyst feed to the reactor was switched back to the silica supported metallocene catalyst. The AS-990 feed to the reactor remained off. After approximately 13 hours of continuous running, a dome sheet was formed. The time of formation of the dome sheet is indicated in FIG. 13 at the relatively sudden increase of the skin TC located in the conical section (9.5' above the distributor plate).

This result is significant because it shows that the conventional silica supported metallocene catalyst requires an effectively continuous feed of additive to avoid dome sheeting. In contrast, the polymer supported catalyst does not require a feed of continuity additive to the reactor.

Accordingly, the polymer supported catalyst operates in the reactor with reduced entrainment static and a reduced sensitivity to dome sheeting compared to the silica supported metallocene catalyst.

Residual metals content of the polymer samples from Parts 1, 2 and 3 of the pilot plant tests were measured and the results are shown in Table 10 below.

TABLE 10

| Catalyst Productivity | | | |
| --- | --- | --- | --- |
| | Metallocene catalyst supported on silica (Part 1) | Batch 1 (Part 2, with AS-990) | Batch 1 (Part 3, without AS-990) |
| Productivity (kg polymer/g transition metal) | 613 | 746 | 769 |

As shown in the table above, the zirconium productivities were 746 and 749 kg of polymer per gram of zirconium for Parts 2 and 3 respectively. This represented a 22-25% increase over the productivity of the conventional silica supported catalyst (Part 1).

Figure 10:
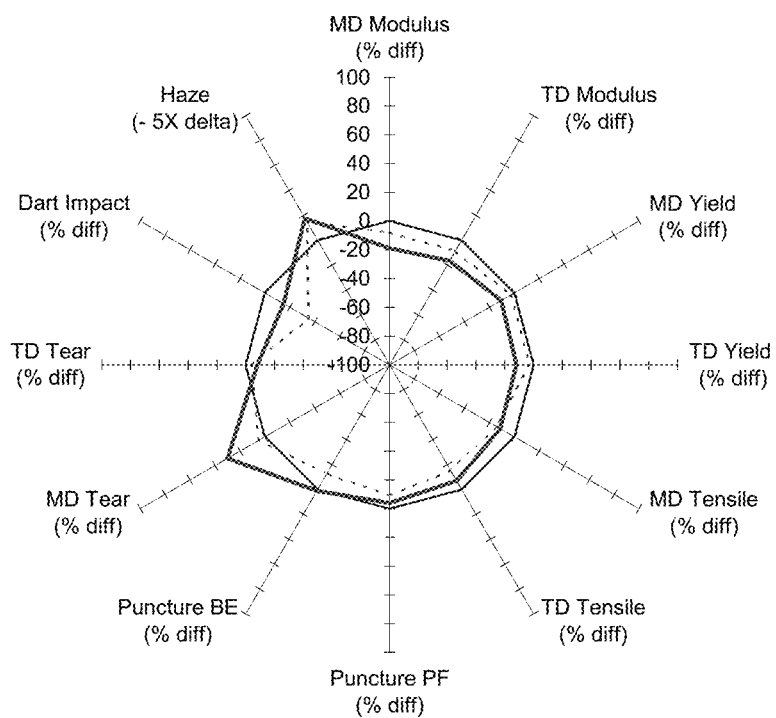
FIG. 10 is a product properties radar plot of the polymer obtained in Example 8.

The resin products made in the pilot plant tests were tested, and the results are summarized in Table 11 below. The results are also shown in graphical form in FIG. 10. Three product samples were tested, corresponding to Parts 1, 2 and 3 from the pilot plant tests. In general, the polymer supported samples may be slightly deficient relative to the control in film strength properties, but appeared to show improved opticals (reduced haze, FIG. 10). FIG. 10 is a product properties radar plot.

The gel content of the samples was a particular concern since the polymer supports contained cross-linking that may not mix properly with the PE resin matrix in the film, which could lead to high gel concentrations (and poor film appearance rating). All films contained numerous tiny gels that were similar in size and appearance but the developmental (polymer supported) samples appeared to have higher frequency. So, it appears that there may have been some increase in gels, but not enough to cause the gross deterioration in film rating that would be expected if the approximately 40 micron cross-linked supports were not fragmenting or not being blended (at least to some extent) in the polymer matrix.

TABLE 11

| Product Properties | | | |
| --- | --- | --- | --- |
| | Part 1 | Part 2 | Part 3 |
| Catalyst Support | Silica | M300 SOG | M300 SOG |
| Additive | AS-990 | AS-990 | w/o AS-990 |
| CHARACTERIZATION | — | — | — |
| MI (I2) | 1.91 | 2.30 | 2.17 |
| HLMI (I21) | 70.9 | 75.5 | 72.7 |
| MIR (I21/I2) | 37.1 | 32.8 | 33.5 |
| Resin Density (g/cc) | 0.9211 | 0.9187 | 0.9206 |
| Tensile | — | — | — |
| Tensile @ Yield (psi) | — | — | — |
| TEN_YIELD_MD | 1420 | 1270 | 1380 |
| TEN_YIELD_TD | 1510 | 1330 | 1470 |
| Ultimate Tensile (psi) | — | — | — |
| ULT_TEN_MD | 6610 | 5860 | 5640 |
| ULT_TEN_TD | 5810 | 5400 | 4930 |
| Ultimate Elongation (%) | — | — | — |
| ULT_ELONG_MD | 650 | 660 | 650 |
| ULT_ELONG_TD | 700 | 720 | 700 |
| 1% Secant (psi) | — | — | — |
| SEC_MOD_MD | 32350 | 26230 | 29730 |
| SEC_MOD_TD | 35520 | 29610 | 32420 |
| Puncture (Method A) | — | — | — |
| Force (lbs/mil) | 8.4 | 8.0 | 7.5 |
| Energy (in · lb/mil) | 22.7 | 20.9 | 16.1 |
| Puncture (Method B) | — | — | — |
| Force (lbs/mil) | 7.6 | 7.3 | 6.9 |
| Energy (in · lb/mil) | 17.5 | 17.7 | 15.3 |
| Elmendorf Tear | — | — | — |
| ELM_TEAR_MD (g/mil) | 200 | 260 | 210 |
| ELM_TEAR_TD (g/mil) | 490 | 450 | 470 |
| Dart Dron (Method A) | — | — | — |
| (g) | 400 | 360 | 280 |
| (g/mil) | 200 | 170 | 130 |
| Gauge Mic (mils) | 2.07 | 2.10 | 2.04 |
| Reblock (g) | 52 | 152 | 102 |
| Transmittance (%) | 92.9 | 92.8 | 92.9 |
| Haze (%) | 14.8 | 11.3 | 11.8 |
| Clarity | 98.6 | 98.5 | 98.4 |
| Gloss MD | 59.7 | 59.6 | 52.1 |
| Gloss TD | 61.8 | 59.1 | 53.0 |

All of the silica supported catalysts showed about the same level of charging, about 1.5 to 2.1 micro-coulombs/gram (negative). This is a significant amount of electrical charge, but is typical of silica supported catalysts. Conversely, the polymer supported catalyst showed a measured charge of 0.19 to 0.31 micro-coulombs/gram (negative), which is a significant difference.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

What is claimed is:

1. A method for reducing gels in a polyethylene polymer, the method comprising:
   polymerizing ethylene and one or more optional comonomers in a reactor in the presence of a metallocene catalyst, hydrogen, and at least one condensing agent to produce polyethylene polymer granules;
   removing polyethylene polymer granules that are 400 microns or less;
   melting the remaining polyethylene polymer granules after having removed the polyethylene polymer granules that are 400 microns or less; and then
   producing a film having an OCS gel count of 175 ppm or less.

2. The method of claim 1, wherein the removing of polyethylene polymer granules that are 400 microns or less comprises passing the polyethylene polymer granules through a screen filter having a mesh size of from 20 microns to 60 microns.

3. The method of claim 1, wherein the film has an OCS gel content of 100 ppm or less.

4. The method of claim 1, wherein the polyethylene polymer has a melt index ($I_2$) of about 0.40 g/10 min.

5. The method of claim 1, wherein the polyethylene polymer has a melt index ($I_2$) of about 0.44 g/10 min.

6. The method of claim 1, wherein the polyethylene polymer has a density of about 0.920 g/cm$^3$.

7. The method of claim 1, wherein the at least one condensing agent is isopentane.

8. The method of claim 1, wherein the polyethylene polymer granules after removing the polyethylene polymer granules that are 400 microns or less have a comonomer content of at least 12 terminal methyl groups per 1000 carbon atoms as measured by $H^1$ NMR.

9. The method of claim 1, wherein the polyethylene polymer has a melt index ($I_2$) of about 0.44 g/10 min, a density of about 0.920 g/cm$^3$, and a comonomer content of at least 12 terminal methyl groups per 1000 carbon atoms as measured by $H^1$ NMR.

10. A method for reducing dome sheeting in a gas phase, fluidized bed reactor, the method comprising:
    polymerizing ethylene and one or more optional comonomers, at least one condensing agent, and hydrogen, in a fluidized bed reactor in the presence of a supported metallocene catalyst; and
    controlling the content of the hydrogen and the at least one condensing agent in the fluidized bed reactor at conditions sufficient to form polyethylene polymer granules having a melt index ($I_2$) of from 0.1 g/10 min to 3.0 g/10 min and a density of from 0.890 g/cm$^3$ to 0.950 g/cm$^3$,
wherein the conditions sufficient to form the polyethylene polymer granules comprise a reaction temperature of from 60° C. to 120° C., a residence time of from 0.5 hr to 5 hours, and wherein the supported metallocene catalyst has a measured charge of from 0.19 to 0.31 micro-coulombs/gram (negative).

11. The method of claim 10, wherein the density is about 0.920 g/cm$^3$.

12. The method of claim 10, wherein the melt index ($I_2$) is about 1.9 g/10 min.

13. The method of claim 10, wherein the support comprises a polydivinylbenzene resin functionalized with epoxide groups.

14. The method of claim 10, wherein the at least one condensing agent is isopentane.

* * * * *